US011938793B2

(12) United States Patent
Snider et al.

(10) Patent No.: US 11,938,793 B2
(45) Date of Patent: Mar. 26, 2024

(54) SEALING SYSTEM FOR MOVABLE WINDOW OF VEHICULAR REAR WINDOW ASSEMBLY

(71) Applicants: Magna Mirrors of America, Inc., Holland, MI (US); Global Supply Innovative Engineering, LLC, Troy, MI (US)

(72) Inventors: Darin J. Snider, Holland, MI (US); David K. Johnson, Holland, MI (US); Shawn O'Neill, Harrison Township, MI (US); Randall Leach, Davisburg, MI (US)

(73) Assignees: Magna Mirrors of America, Inc., Holland, MI (US); Global Supply Innovative Engineering, LLC, Troy, MI (US)

( * ) Notice: Subject to any disclaimer, the term of this patent is extended or adjusted under 35 U.S.C. 154(b) by 1000 days.

(21) Appl. No.: 16/817,720

(22) Filed: Mar. 13, 2020

(65) Prior Publication Data

US 2020/0290443 A1    Sep. 17, 2020

Related U.S. Application Data

(60) Provisional application No. 62/818,139, filed on Mar. 14, 2019.

(51) Int. Cl.
*B60J 10/76*    (2016.01)
*B29C 45/00*    (2006.01)
(Continued)

(52) U.S. Cl.
CPC ........... *B60J 10/76* (2016.02); *B29C 45/0001* (2013.01); *B29C 45/0053* (2013.01);
(Continued)

(58) Field of Classification Search
CPC .......... B60J 10/76; B60J 10/21; B60J 1/1853
See application file for complete search history.

(56) References Cited

U.S. PATENT DOCUMENTS 957,728 A      5/1910   Bliss
1,204,702 A    11/1916  Schupp
(Continued)

FOREIGN PATENT DOCUMENTS

WO    WO-2013112694 A1 *   8/2013   ................ B60J 1/17

*Primary Examiner* — Marcus Menezes
(74) *Attorney, Agent, or Firm* — HONIGMAN LLP

(57) ABSTRACT

A vehicular slider window assembly includes at least one fixed window panel having an opening, and upper and lower rails fixedly disposed at the at least one fixed window panel. A movable window panel is movable along the rails between a closed position and an opened position. A perimeter seal is disposed at a surface of the fixed window panel, with the perimeter seal providing a continuous sealing element that circumscribes the opening and that is configured to seal against a surface of the movable window panel when the movable window panel is closed. The perimeter seal includes elongated sealing portions having respective elongated sealing lips disposed along respective base portions. The perimeter seal is formed via a multi-shot injection molding process, with the base portions formed via a first shot injection molding process and the sealing lips formed along the base portions via a second shot injection molding process.

19 Claims, 12 Drawing Sheets

(51) Int. Cl.
  *B29C 45/16* (2006.01)
  *B29C 65/00* (2006.01)
  *B29C 65/48* (2006.01)
  *B60J 1/18* (2006.01)
  *B60J 10/21* (2016.01)
  *B60J 10/34* (2016.01)
  *B29K 23/00* (2006.01)
  *B29L 31/26* (2006.01)
  *B29L 31/30* (2006.01)

(52) U.S. Cl.
  CPC .......... *B29C 45/1676* (2013.01); *B29C 65/48* (2013.01); *B29C 66/474* (2013.01); *B60J 1/1853* (2013.01); *B60J 10/21* (2016.02); *B60J 10/34* (2016.02); *B29K 2023/12* (2013.01); *B29L 2031/26* (2013.01); *B29L 2031/3052* (2013.01)

(56) References Cited

U.S. PATENT DOCUMENTS

| | | |
|---|---|---|
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,894,954 A | 1/1990 | Nozaki et al. |
| 4,920,698 A * | 5/1990 | Friese .................. E05F 15/662 49/362 |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A * | 11/1994 | Kronbetter ............ E06B 7/2305 49/404 |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A * | 4/1996 | Gillen .................... B60J 1/1853 49/408 |
| 5,522,191 A * | 6/1996 | Wenner .................. B60J 10/74 52/204.51 |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A * | 9/1998 | Freimark ............... B60J 1/1853 49/213 |
| 5,799,449 A | 9/1998 | Lyons et al. |
| 5,822,922 A | 10/1998 | Grumm et al. |
| 5,836,110 A | 11/1998 | Buening |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A | 1/2000 | Ray et al. |
| 6,026,611 A | 2/2000 | Ralston et al. |
| 6,038,819 A | 3/2000 | Klein |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,293,609 B1 | 9/2001 | Xu et al. |
| 6,324,788 B1 | 12/2001 | Koneval et al. |
| 6,328,243 B1 | 12/2001 | Yamamoto |
| 6,393,766 B2 | 5/2002 | Nozaki et al. |
| 6,490,832 B1 | 12/2002 | Fischbach et al. |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,783,171 B2 | 8/2004 | Teishi et al. |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,014,251 B1 | 3/2006 | Husk |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 7/2008 | Lahnala |
| 7,400,435 B2 | 7/2008 | Byers et al. |
| 7,437,852 B2 | 10/2008 | Dufour et al. |
| 7,608,949 B2 | 10/2009 | Busch |
| 7,626,749 B2 | 12/2009 | Baur et al. |
| RE41,502 E | 8/2010 | Neaux |
| 7,871,272 B2 | 1/2011 | Firman, II et al. |
| 7,900,863 B1 | 3/2011 | Cheng |
| 7,934,342 B2 | 5/2011 | Lahnala |
| 7,963,070 B2 * | 6/2011 | Recker .................. B60J 1/1853 49/213 |
| 8,042,664 B2 | 10/2011 | Rutkowski et al. |
| 8,069,615 B2 | 12/2011 | Heiman et al. |

(56) References Cited

U.S. PATENT DOCUMENTS

| | | | |
|---|---|---|---|
| 8,127,498 B2* | 3/2012 | Lahnala | B60J 1/1853 49/413 |
| 8,151,519 B2 | 4/2012 | Bello et al. | |
| 8,250,812 B2* | 8/2012 | Hebert | B60J 1/1853 49/413 |
| 8,272,168 B2* | 9/2012 | Lahnala | B60J 1/1853 49/408 |
| 8,322,075 B2* | 12/2012 | Lahnala | E05D 15/0686 49/408 |
| 8,402,695 B2 | 3/2013 | Smith et al. | |
| 8,881,458 B2 | 11/2014 | Snider et al. | |
| 8,915,018 B2 | 12/2014 | Snider | |
| 9,211,780 B2* | 12/2015 | Lahnala | B60J 10/70 |
| 9,242,533 B2 | 1/2016 | Snider et al. | |
| 9,475,364 B2* | 10/2016 | Tooker | B60J 10/21 |
| 9,894,717 B2 | 2/2018 | Ash, Jr. et al. | |
| 10,023,026 B2 | 7/2018 | Snider et al. | |
| 10,239,397 B2* | 3/2019 | Snider | B60J 1/1853 |
| 2003/0074842 A1 | 4/2003 | Eckhardt et al. | |
| 2003/0140562 A1 | 7/2003 | Staser et al. | |
| 2003/0188487 A1 | 10/2003 | Rasmussen | |
| 2003/0188490 A1 | 10/2003 | Kraus et al. | |
| 2003/0213179 A1 | 11/2003 | Galer | |
| 2004/0020131 A1 | 2/2004 | Galer et al. | |
| 2004/0065017 A1 | 4/2004 | Priest et al. | |
| 2004/0065018 A1 | 4/2004 | Regnier et al. | |
| 2005/0073172 A1 | 4/2005 | Weinert et al. | |
| 2006/0032140 A1 | 2/2006 | Arimoto et al. | |
| 2006/0061008 A1 | 3/2006 | Karner et al. | |
| 2006/0107600 A1 | 5/2006 | Nestell et al. | |
| 2006/0130405 A1 | 6/2006 | Hemond et al. | |
| 2006/0175762 A1 | 8/2006 | Barnett et al. | |
| 2007/0157522 A1 | 7/2007 | Hebert et al. | |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0155902 A1 | 7/2008 | Kaiser | |
| 2008/0202032 A1 | 8/2008 | Loidolt | |
| 2009/0019778 A1 | 1/2009 | Lahnala | |
| 2009/0322705 A1 | 12/2009 | Halsey, IV | |
| 2010/0107505 A1 | 5/2010 | Schreiner et al. | |
| 2010/0122497 A1* | 5/2010 | Lahnala | E05D 15/06 49/413 |
| 2010/0146859 A1 | 6/2010 | Gipson et al. | |
| 2010/0154312 A1 | 6/2010 | Gipson et al. | |
| 2010/0182143 A1 | 7/2010 | Lynam | |
| 2010/0240229 A1 | 9/2010 | Firman, II et al. | |
| 2010/0263290 A1 | 10/2010 | Pawloski et al. | |
| 2011/0030276 A1 | 2/2011 | Smith et al. | |
| 2011/0233182 A1 | 9/2011 | Baranski | |
| 2012/0091113 A1 | 4/2012 | Bennett et al. | |
| 2012/0091114 A1 | 4/2012 | Ackerman et al. | |
| 2012/0117880 A1 | 5/2012 | Ahnala et al. | |
| 2012/0139289 A1 | 6/2012 | Lahnala | |
| 2013/0174488 A1 | 7/2013 | Snider et al. | |
| 2013/0255156 A1 | 10/2013 | Snider | |
| 2013/0277352 A1 | 10/2013 | Degen et al. | |
| 2013/0283693 A1 | 10/2013 | Huizen et al. | |
| 2014/0047772 A1 | 2/2014 | Hulst | |
| 2014/0091074 A1 | 4/2014 | Lisinski et al. | |
| 2015/0028622 A1* | 1/2015 | Lahnala | B60J 10/76 49/404 |
| 2015/0101254 A1 | 4/2015 | Tooker et al. | |
| 2016/0135250 A1 | 5/2016 | Snider et al. | |
| 2016/0167488 A1* | 6/2016 | Snider | B60J 1/1861 49/404 |
| 2017/0036523 A1* | 2/2017 | Tooker | B60J 1/1853 |
| 2019/0383084 A1 | 12/2019 | Snider et al. | |
| 2020/0317037 A1* | 10/2020 | Yang | B29C 48/16 |
| 2021/0379974 A1* | 12/2021 | Snider | B60J 10/74 |

* cited by examiner

“SEALING SYSTEM FOR MOVABLE
WINDOW OF VEHICULAR REAR WINDOW
ASSEMBLY

CROSS REFERENCE TO RELATED
APPLICATION

The present application claims the filing benefits of U.S. provisional application Ser. No. 62/818,139, filed Mar. 14, 2019, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include two or more panels, such as one or two fixed window panels and a slidable window panel. The slidable window panel is supported by rails and may be moved along the rails to open and close the window. The slidable window panel may be manually moved or may be driven or moved by a cable drive system.

SUMMARY OF THE INVENTION

The present invention provides a vehicular rear slider window assembly that has a unitarily formed perimeter seal for sealing the movable window panel relative to the fixed window panels when the movable window panel is closed. The perimeter seal comprises elongated sealing portions with corner sealing tabs or lips molded or formed at the ends of respective elongated sealing portions. The perimeter seal is formed via a multi-shot molding process. For example, the perimeter seal may be formed via a two (or more) shot molding process, with a first shot or molding process injection molding a base portion of each sealing portion and with a second shot or molding process injection molding at least one sealing lip along the respective base portion of each sealing portion. The perimeter seal also comprises corner sealing elements molded at and joining the adjacent ends of some of the sealing lips. The perimeter seal also includes other corner sealing elements molded at and extending from a respective end of a sealing lip and spaced from an adjacent end of another sealing lip, with a flexible seal element joining the corner sealing element with the adjacent sealing lip to allow for flexing of the sealing lips at the corner region.

These and other objects, advantages, purposes and features of the present invention will become apparent upon review of the following specification in conjunction with the drawings.

DESCRIPTION OF THE PREFERRED
EMBODIMENTS

Figure 1:
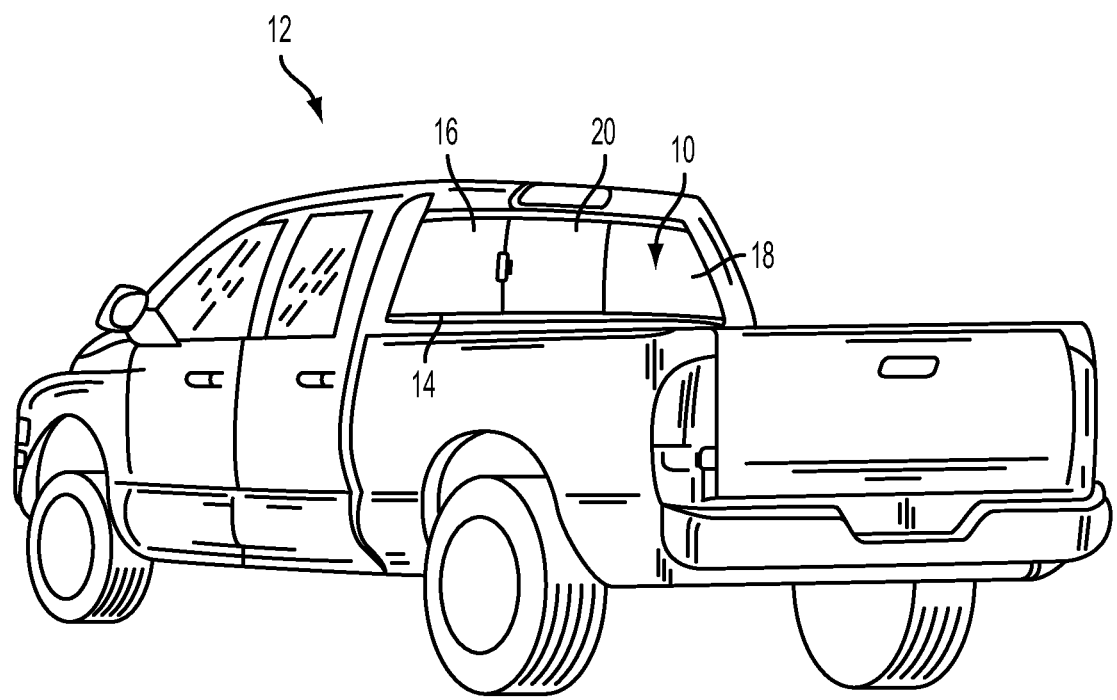
FIG. 1 is a rear perspective view of a pickup truck having a rear slider window assembly in accordance with the present invention.
Figure 2:
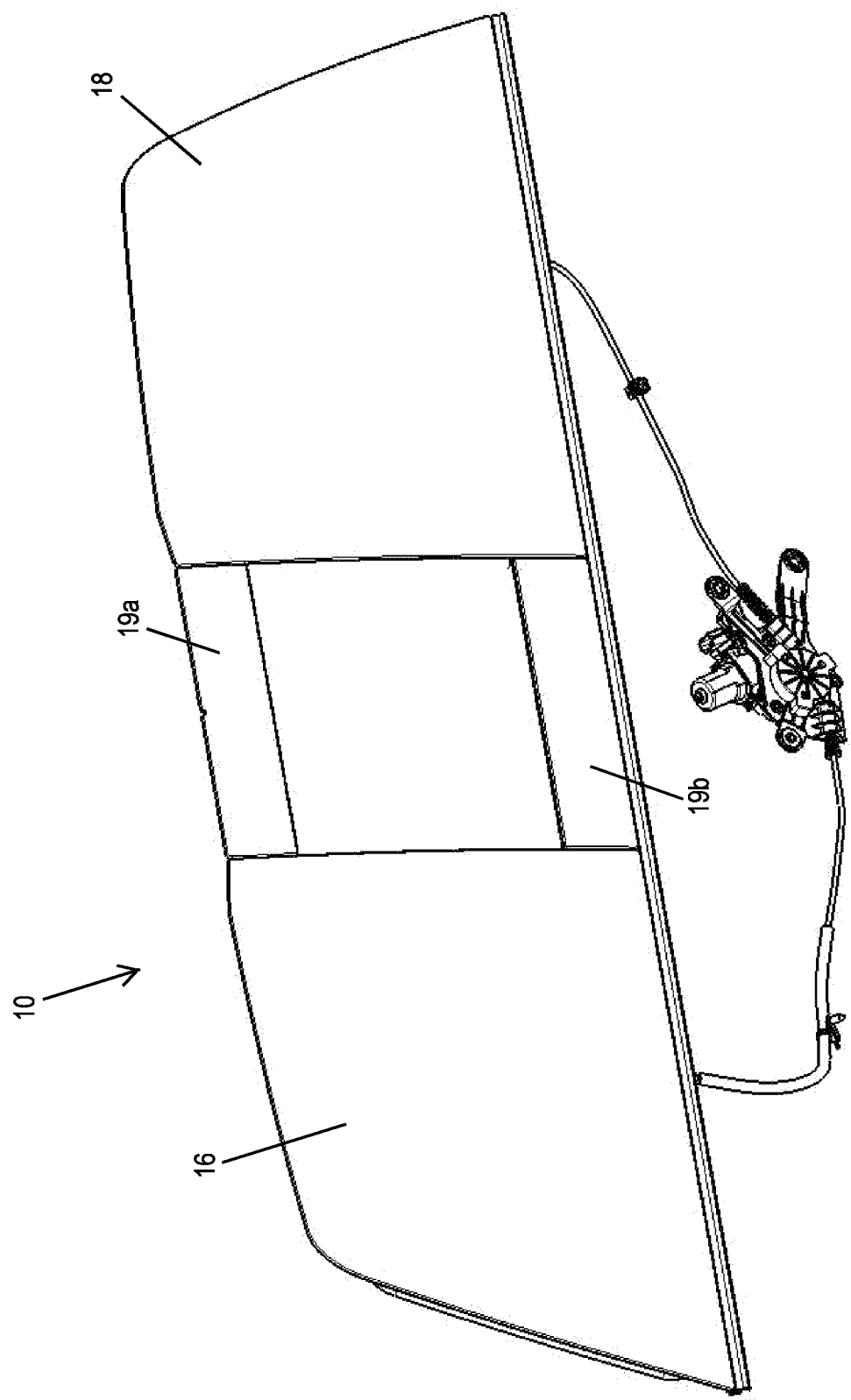
FIG. 2 is a perspective view of the rear slider window assembly.
Figure 3:
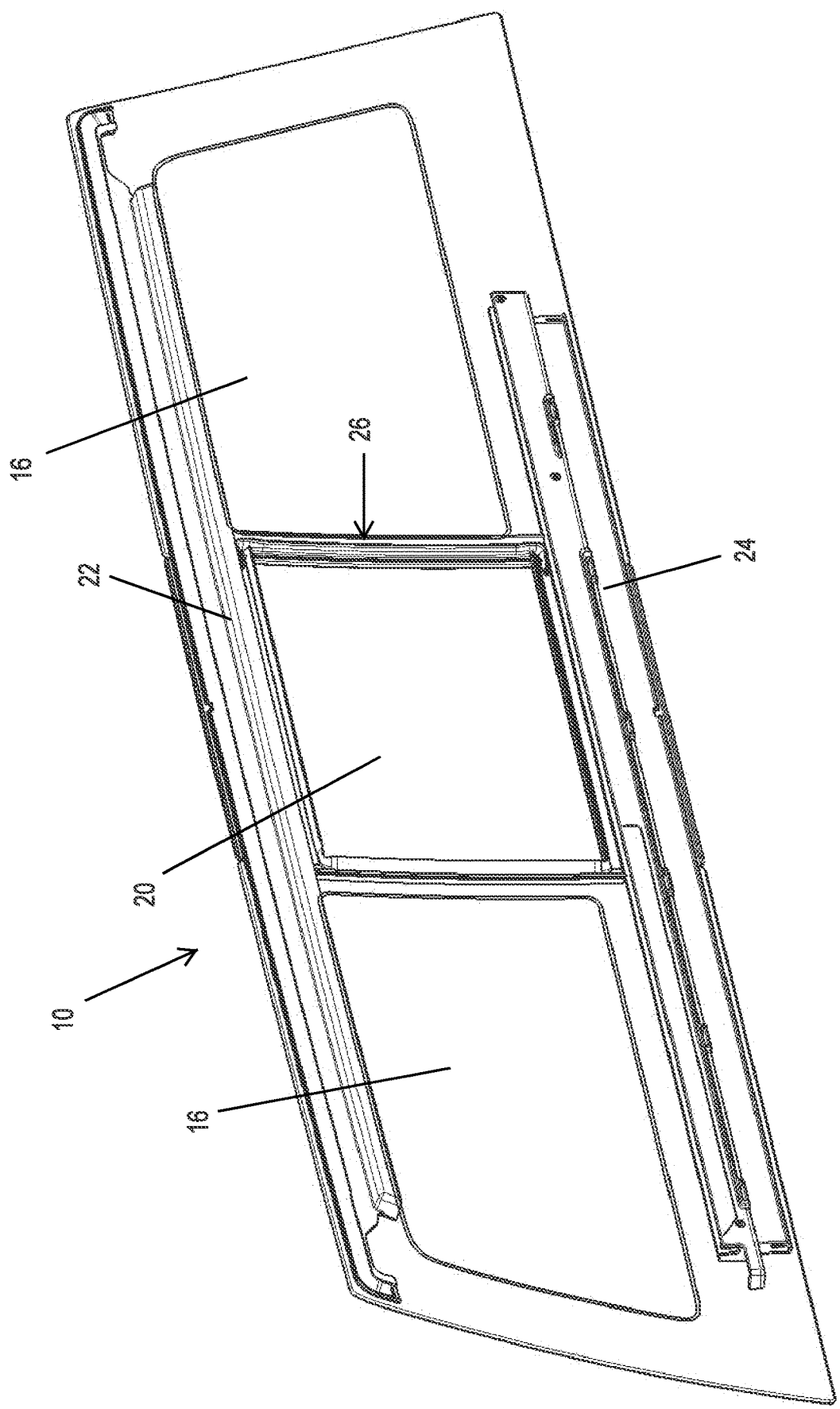
FIG. 3 is another perspective view of the rear slider window assembly.

Referring now to the drawings and the illustrative embodiments depicted therein, a rear slider window assembly 10 of a vehicle 12 (such as a pickup truck or the like) includes a fixed window panel 16 (or a pair of side fixed window panels or fixed window panel portions) having an opening established therethrough, and a movable window panel that is movable relative to a frame or rails 14 and the fixed window panel 16 between an opened position and a closed position (FIGS. 1-3). The rails include an upper rail 22 and a lower rail 24, with the upper and lower edge regions of the movable window panel (FIG. 1) movably or slidably received in and along the respective upper and lower rails 22, 24. The window assembly 10 includes a perimeter seal 26 disposed at the fixed window panels and around window opening or aperture established between the side panel portions of the fixed panel 16. When the movable window panel is closed, the perimeter seal 26 seals against a perimeter region of the surface of the movable window panel that faces the fixed window panel. The perimeter seal comprises a continuous seal having corner regions that include an integral sealing lip at the corner of at least the upper and lower ends of one of the vertical sealing portions (such as at the latch side of the movable window panel), as discussed below.

In the illustrated embodiment, the window assembly comprises two fixed window panels or panel portions that are spaced apart so as to define an opening therebetween, with upper and lower appliqués or trim or filler panels or elements 19a, 19b disposed at the upper and lower regions of the opening and between the fixed window panels. Optionally, the window assembly may comprise a hole-in-glass window configuration, where the single fixed glass panel has an aperture or hole or opening established therethrough to define separate spaced apart fixed window panels or panel portions. The window assembly may utilize aspects of the window assemblies described in U.S. Pat. Nos. 8,915,018 and/or 8,881,458, and/or U.S. Publication No. US-2003-0213179, which are all hereby incorporated herein by reference in their entireties. The perimeter seal may utilize aspects of the sealing systems described in U.S. Pat.

Nos. 10,239,397; 9,475,364 and/or 9,242,533, which are hereby incorporated herein by reference in their entireties.

The upper and lower rails 22, 24 may comprise any suitable channel or rail element configured to slidably receive an upper or lower edge portion of the movable window panel. The movable window panel 20 is movable along the lower rail 24 and the upper rail 22 of the frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14. The rails and window assembly may utilize aspects of the rails and window assemblies described in U.S. Pat. No. 10,023,026, which is hereby incorporated herein by reference in its entirety.

The perimeter seal 26 comprises a continuous seal having a first side leg or portion 30, an upper leg or portion 28, a second side leg or portion 34 and a lower leg or portion 32. Each of the sealing legs or portions 28, 30, 32, 34 has a respective elongated body portion or base portion 28a, 30a, 32a, 34a that has an attachment surface or element or portion 28b, 30b, 32b, 34b for attaching at the fixed window panel or panels and the rail attachment portions at the upper and lower appliqués and around the opening. For example, the attachment element may comprise an adhesive strip established along the body portion of the respective sealing leg for adhesively attaching the perimeter seal 26 to the fixed window panels around the opening (such as to portions of the fixed window panel that have a darkened or opaque or non-light-transmissive coating established thereat). In the illustrated embodiment (and such as shown in FIGS. 7A-D), the base portions 28a, 30a, 32a, 34a are formed with a recessed attachment surface 28b, 30b, 32b, 34b that receives a bead of adhesive therein and that includes side walls the set the bond-line thickness of the adhesive at the glass or plastic surface at which the perimeter seal is attached. The perimeter seal thus may be adhered or otherwise attached to the surface of the fixed window panel (with the adhesive strip attached at the back of the elongated body portion and having a removable film or cover that is removed to expose the adhesive for attaching at the window panel) around the opening so as to circumscribe the opening or aperture (or, for two fixed window panel configurations, the perimeter seal may be adhered or otherwise attached to the surfaces of the fixed window panels and to the upper and lower appliqués so as to circumscribe the opening).

Each of the legs or portions 28, 30, 32, 34 of the perimeter seal 26 has a respective seal configuration comprising a respective sealing lip 28c, 30c, 32c, 34c established along and formed or extruded with the base portion 28a, 30a, 32a, 34a, as discussed in detail below. Also, each of the legs or seal portions 28, 30, 32, 34 has its end regions joined to adjacent end regions of adjacent ones of the other sealing legs or portions via respective corner sealing elements 36, 37, 38, 39, as also discussed below.

The perimeter seal 26 is formed via a multi-shot molding process. For example, the perimeter seal may be formed via a two (or more) shot injection molding process, which molds (such as via a plastic injection molding process) the base portions 28a, 30a, 32a, 34a during a first molding process or first shot, and which molds (such as via a plastic injection molding process) the sealing lips 28c, 30c, 32c, 34c along the respective base portions during a second molding process or second shot. For example, the base portions may be injection molded out of a rigid polypropylene material or the like, and the sealing lips may be overmolded along the base portions using a soft rubber material (such as a thermoplastic elastomer or Santoprene rubber material or the like). Optionally, the base portion and/or the sealing lips may comprise extruded elements, with the corner sections overmolded to join the extruded elongated sealing elements together.

In the illustrated embodiment, the seal portions 28, 30, 32, 34 provide a desired sealing lip configuration for their particular application or position or orientation relative to the movable window panel. For example, the vertical seal portion 34 is at the side of the window opening at which the movable window panel will slide along as it is opened and closed, and thus may have a sealing lip configuration (e.g., a Y-shaped sealing lip configuration) that seals against the window panel as it is moved in either direction, while the other vertical seal portion 30 is at the opposite side of the window opening, where the movable window panel will be moved to when it is closed, and thus may have a sealing lip configuration that is configured for engagement with the window panel during only small movement of the window panel, and the upper and lower seal portions 28, 32 are configured to seal against the surface of the window panel as the window panel moves in a longitudinal direction along the seal portions 28, 32.

Figure 7:
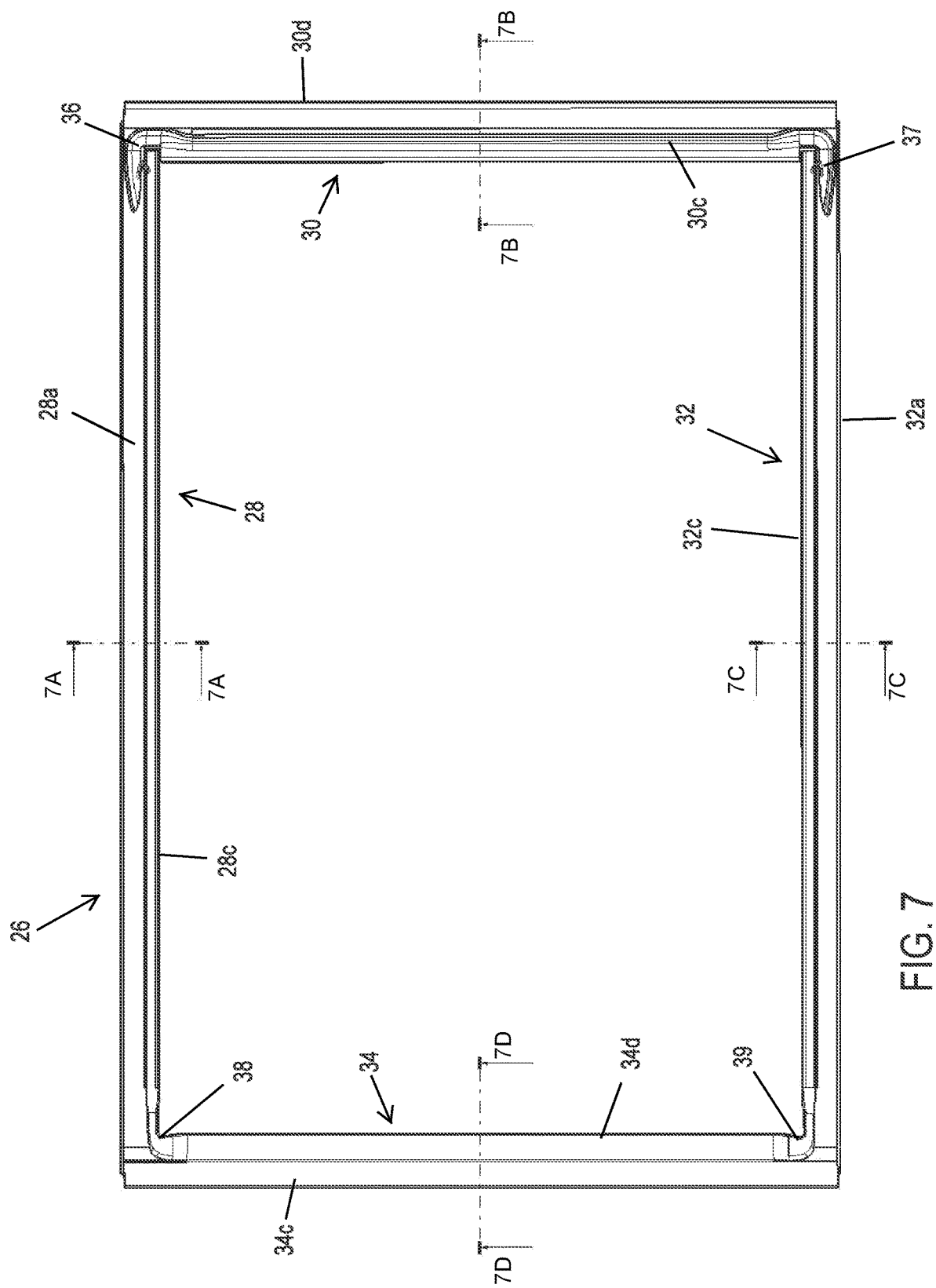
FIG. 7 is a plan view of the perimeter seal.
Figure 7A:
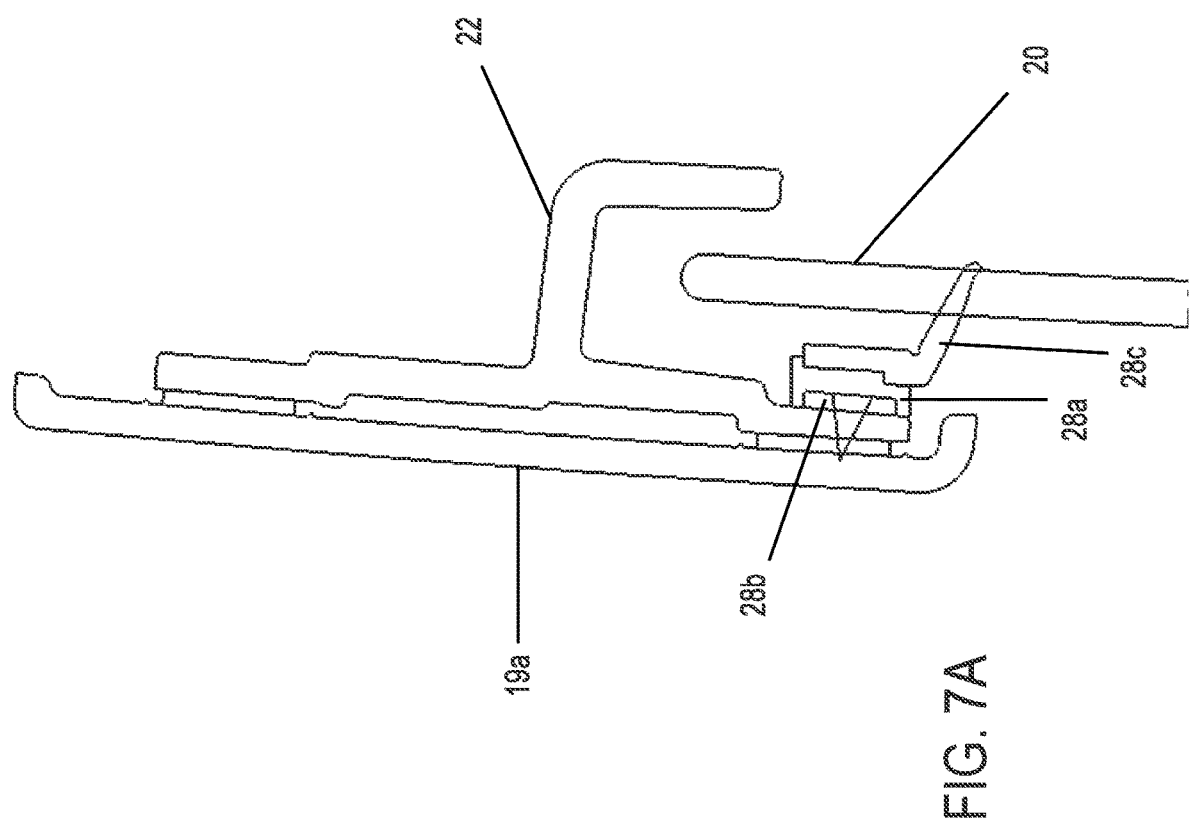
FIG. 7A is a sectional view of the perimeter seal and window taken along the line 7A-7A in FIG. 7.
Figure 7B:
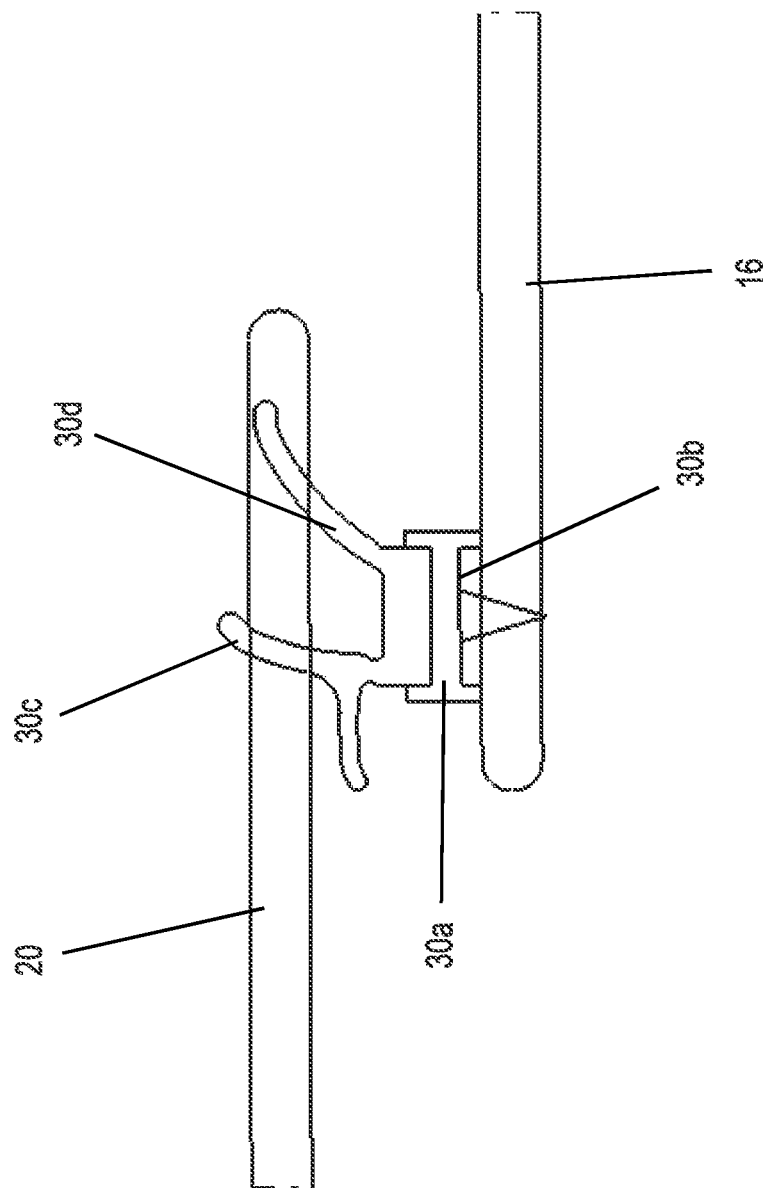
FIG. 7B is a sectional view of the perimeter seal and window taken along the line 7B-7B in FIG. 7.
Figure 7C:
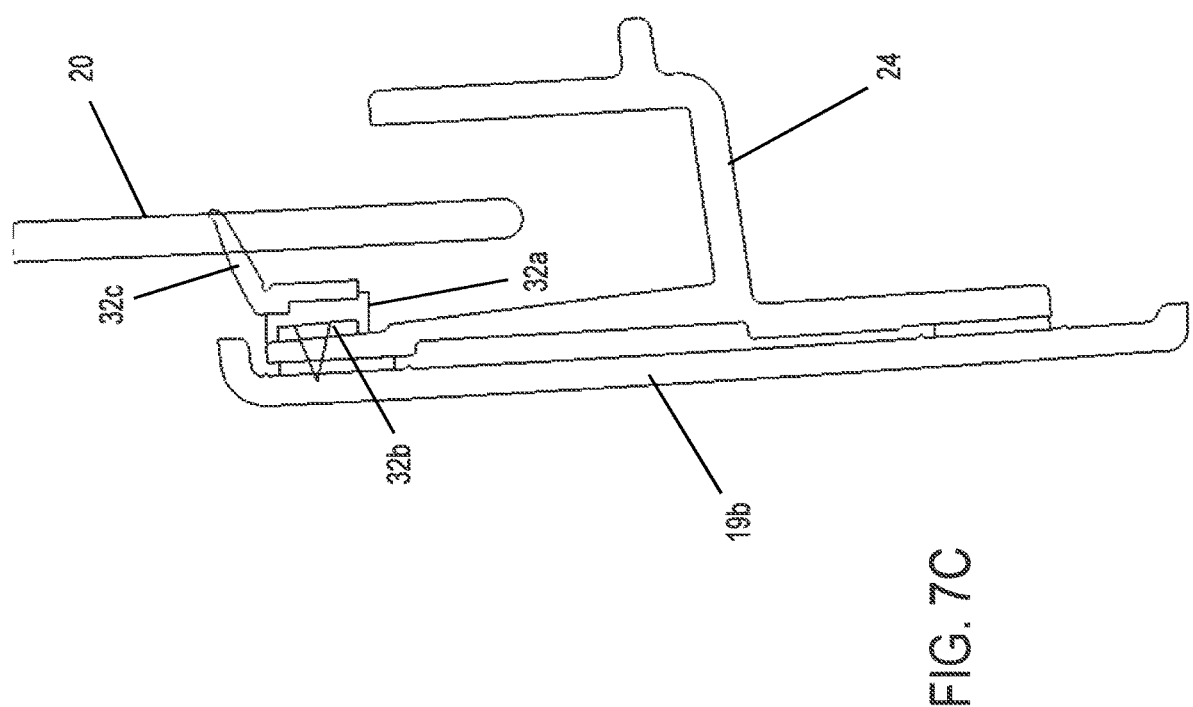
FIG. 7C is a sectional view of the perimeter seal and window taken along the line 7C-7C in FIG. 7.
Figure 7D:
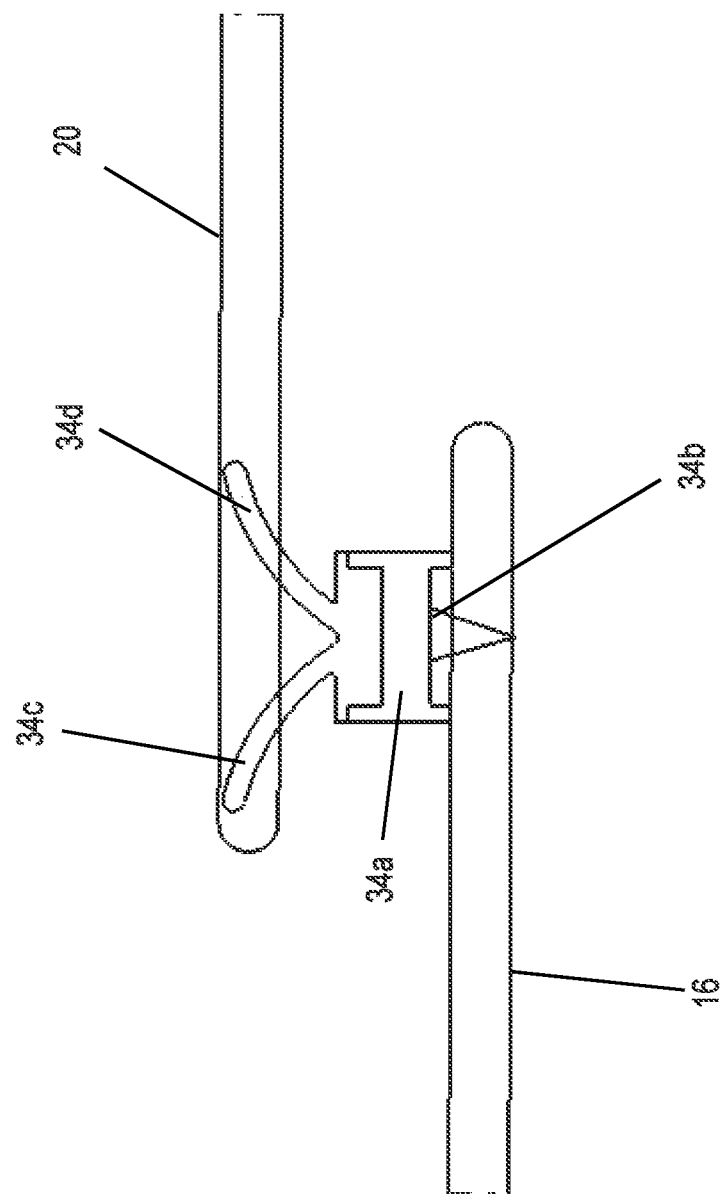
FIG. 7D is a sectional view of the perimeter seal and window taken along the line 7D-7D in FIG. 7.

The seal portion 34 may have a Y-shaped sealing lip configuration (as best shown in FIG. 7D) having two flexible lips 34c, 34d that flex in opposite directions, while the seal portion 32 may have a double lip configuration (as best shown in FIG. 7B) having two flexible lips 32c, 32d that flex or curve in the closing direction of the movable window panel so that the lips seal against the surface of the movable window panel as it is closed. The upper and lower seal portions 28, 32 comprise single lip seal configurations (as best shown in FIGS. 7A and 7C) having a single flexible sealing lip 28c, 32c that flexes towards the opening and slidably engages the upper perimeter region of the surface of the movable window panel as the panel moves between its opened and closed positions.

Figure 8:
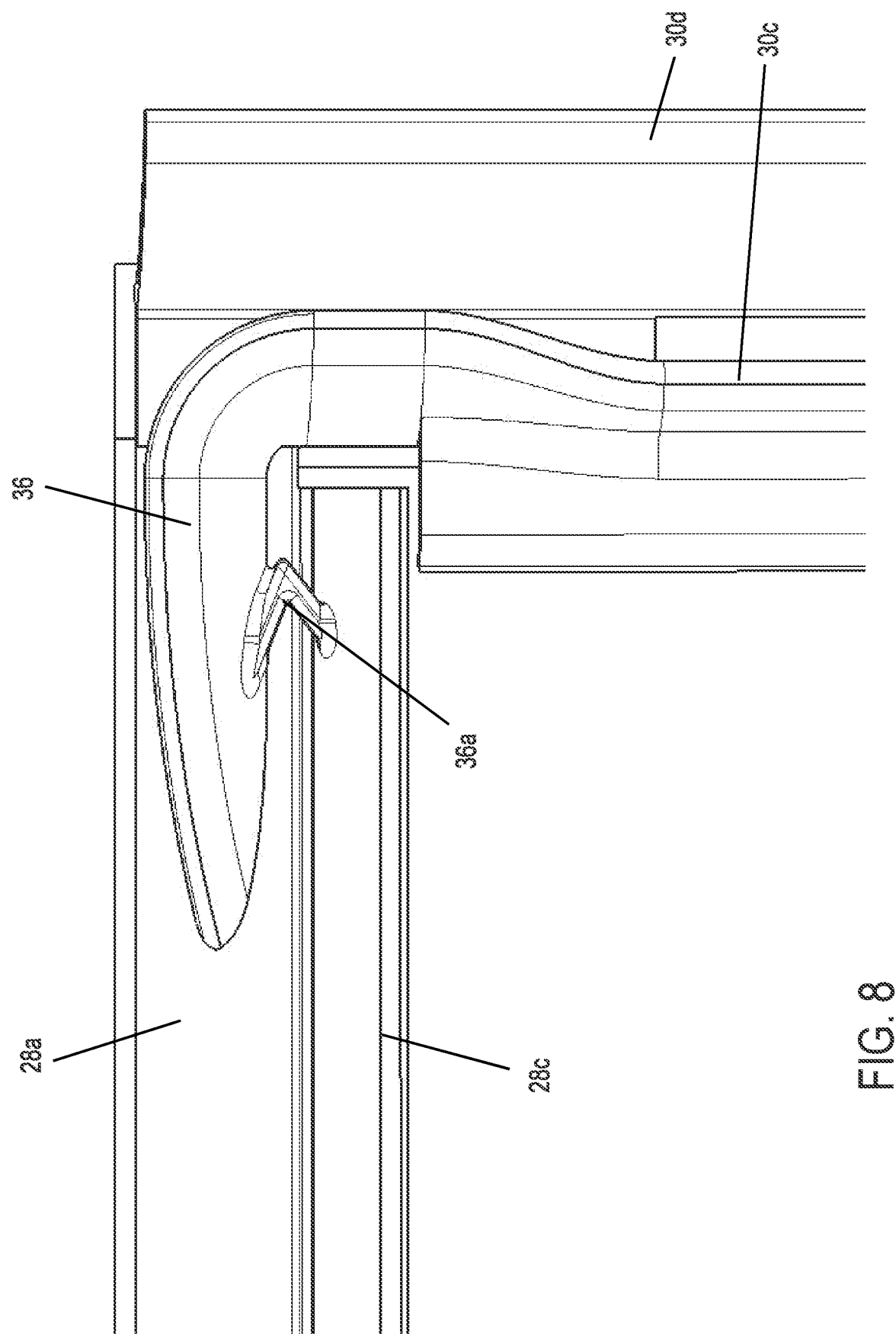
FIG. 8 is an enlarged view of a corner region of the perimeter seal, showing the curved sealing lip that extends from the vertical sealing lip and partially along the upper sealing lip.

In the illustrated embodiment, and as best seen with reference to FIG. 8, the upper sealing leg 28 and vertical sealing leg 30 are joined or molded together. At the corner junction of the sealing legs 28 and 30 (and similarly at the lower corner junction of sealing legs 30 and 32), a sealing tab or lip 36 is established so as to provide additional sealing at the corner regions and at the glass surface of the fixed window panel 16. The sealing lip 36 extends from the inboard sealing lip 30c of the sealing leg 30 and partially along the upper sealing leg 28 above the sealing lip 28c and extends towards the glass surface of the movable glass window panel 16 when the seal 26 is attached at the window panels and appliqués. The sealing tab or lip 36 engages the glass surface of the movable window panel 20 when the seal 26 is attached at the fixed window panel 16 and the upper appliqué 19a and when the movable window panel is closed. The sealing tab or lip 36 limits water intrusion at the curved attachment area of the upper sealing leg 28 at the upper rail 22.

Similarly, the lower sealing leg 32 and vertical sealing leg 30 are joined or molded together at a lower corner region. At the corner junction of the sealing legs 32 and 30, a sealing lip 37 is established at the end regions of sealing legs 32, 30 so as to provide additional sealing at the lower corner region and at the glass surface of the movable window panel 20 when the movable window panel is closed. The sealing lip 37 extends from the lower end of the inboard sealing lip 30c of the sealing leg 30 and partially along the lower sealing leg 32 below the sealing lip 32c and extends towards the glass surface of the movable glass window panel 20 when the seal 26 is attached at the window panels and appliqués. The sealing lip 37 limits water intrusion at the attachment area of the lower sealing leg 32 at the lower rail 24.

The sealing lips 36, 37 are formed so that they curve away from the end of the respective upper or lower lip 28c, 32c and then curve along the respective upper or lower sealing leg 28, 32 and taper toward the sealing leg 28, 32. As can be seen with reference to FIG. 8, the upper lip 28c (and similarly the lower lip 32c) terminates such that there is a gap between the end of the lip 28c and the corner sealing lip 36 (and similarly there is a gap between the end of the lip 32c and the corner sealing lip 37). The sealing lip 36 is thus not directly connected to or joined with the end of the upper sealing lip 28c. However, a flexible joining element 36a (such as, for example, a bendable or accordion-type element) joins a portion of the corner sealing lip 36 to a portion of the upper lip 28c. The seals and flexible joining elements are molded together in the respective injection molding step or process.

Thus, the sealing lips 28c, 30c, 36 are joined but, when pressed against the glass, are allowed to flex in different directions due to the gap between the seals and the accordion-type element. For example, when the seals are pressed against the glass, the upper horizontal sealing lip flexes downward and the vertical sealing lip flexes to the right, with the downward flexing of the upper sealing lip 28c pulling at the corner sealing lip 36 (joined to the upper part of the vertical sealing lip 30c) via the accordion-type element, and not pulling directly at the vertical sealing lip 30c in a direction opposite the direction that the vertical sealing lip 30c flexes. This is an improvement because, if the sealing lips 28c, 30c are joined together at the corner, the seals pull at each other and limit the desired flexing. With the gap at the corner (between the sealing lips) and the flexible joining element that joins the corner sealing lip with the upper or lower sealing lip), the vertical sealing lip 30c can flex to the right and the upper sealing lip 28c can flex downward (and similarly the lower sealing lip 32c can flex upward), without one of the seals limiting the flexing of the other seal and possibly causing an ineffective seal against the glass at the corner regions.

Figure 4:
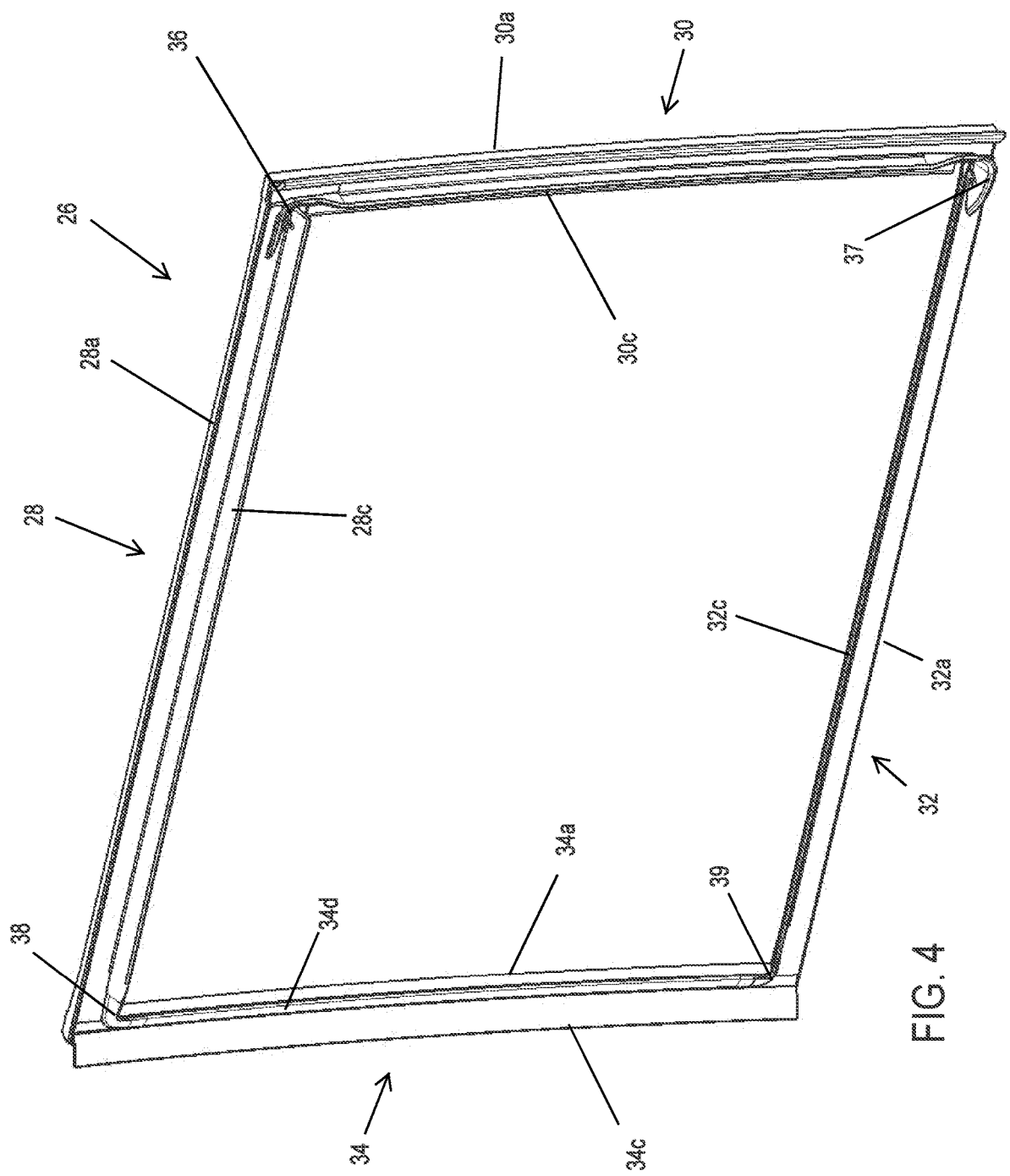
FIG. 4 is a perspective view of a perimeter seal for the sealing the movable window panel a the window assembly when in its closed position.
Figure 5:
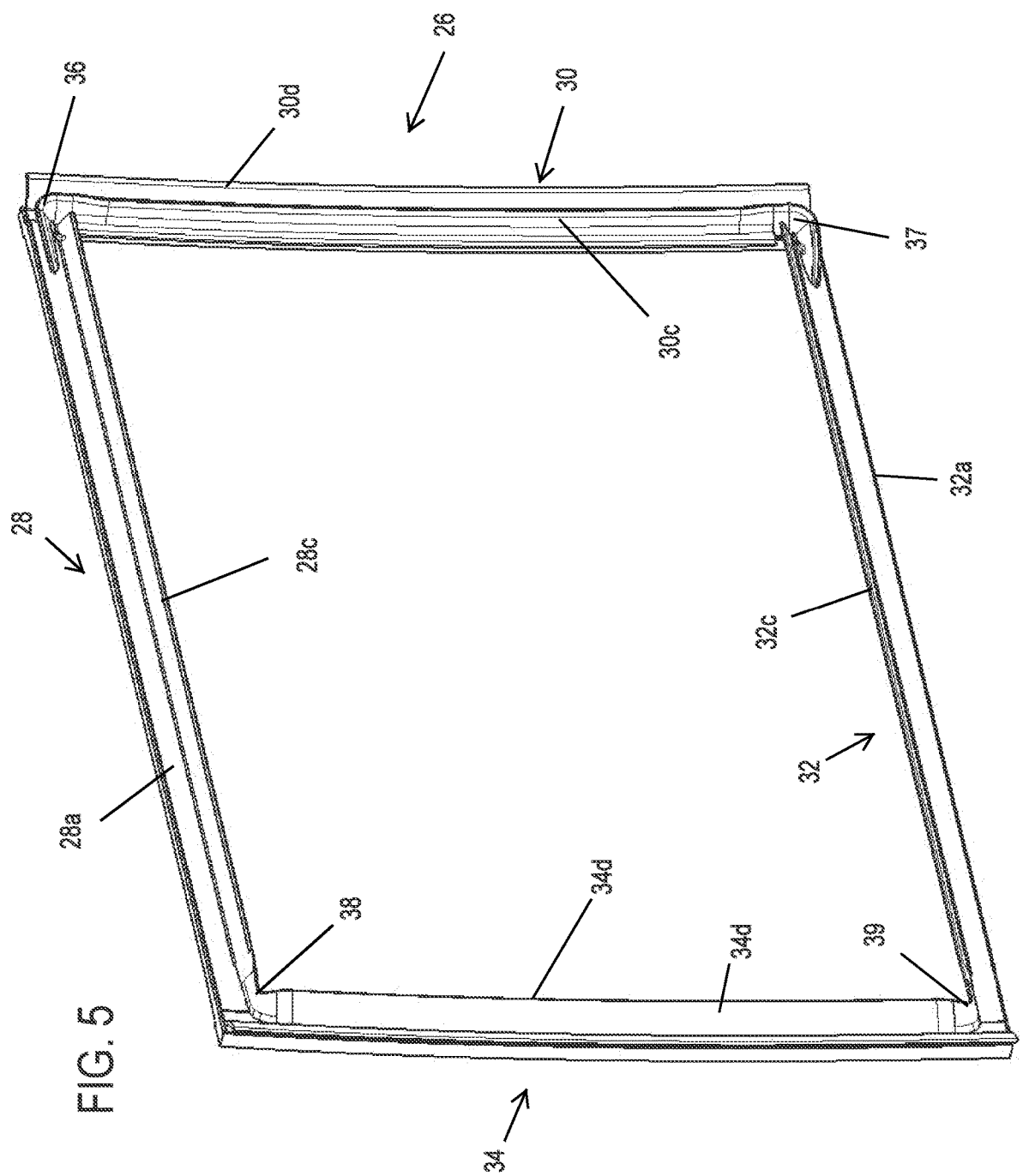
FIG. 5 is another perspective view of the perimeter seal.
Figure 6:
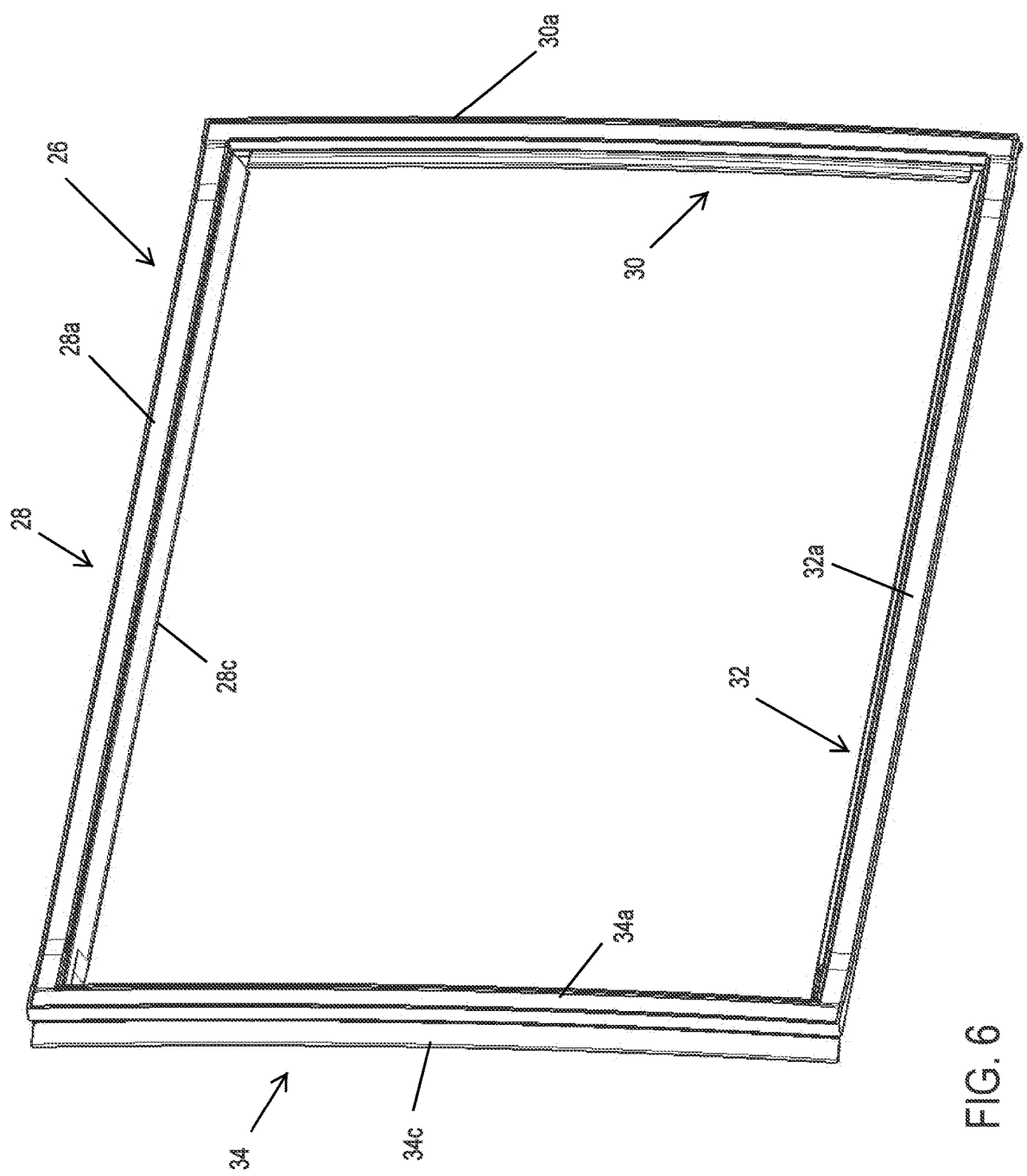
FIG. 6 is an opposite perspective view of the perimeter seal.

Although shown and described as having the additional lip at the corner junctions of the double seal sealing leg 30 and the upper and lower sealing legs 28, 32, an additional sealing lip 38, 39 is also provided at the corner junctions of the Y-seal sealing leg 34 and the upper and lower sealing legs 28, 32. As can be seen with reference to FIGS. 4, 5 and 7, the corner sealing lips 38, 39 join the ends of the inboard vertical lip 34d of the Y-shaped sealing configuration and the respective end of the upper and lower sealing lips 28c, 32c so as to provide a continuous seal against the glass at the corner regions of the perimeter seal.

Thus, the perimeter seal of the present invention may be formed to provide a continuous perimeter seal about an opening of a rear slider window assembly (or other type of window assembly). The sealing legs may comprise extruded sealing elements that are extruded or otherwise formed of a flexible rubber material (or any suitable sealing material). The corners or junctions of the sealing legs may be molded or joined together and an additional sealing lip may be provided or established at the corner region (such as by overmolding the additional sealing lip (such as via injection molding or the like) as part of the sealing lips at the end regions of the vertical sealing leg so as to limit water intrusion at the corner regions. When formed in this manner, the perimeter seal comprises a unitary perimeter seal that may be attached or adhered to the glass surface of the fixed window panel so that the perimeter seal provides a continuous sealing lip about its periphery and fully circumscribes the opening of the window with a continuous sealing lip. Thus, the present invention provides for enhanced sealing at the window seal with no gaps between sealing lips or elements arranged around the window opening.

The movable or slider window panel 20 is thus movable between its opened and closed positions and along the sealing elements, which maintain sealing engagement with the window panel as it moves along the rails 22, 24 of the window assembly. The movable window panel may be movable via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. Nos. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular slider window assembly, said vehicular slider window assembly comprising:
at least one fixed window panel, said at least one fixed window panel defining an opening;
an upper rail and a lower rail fixedly disposed at said at least one fixed window panel;
a movable window panel that is movable along said upper rail and said lower rail, wherein said movable window panel is movable between a closed position, where said movable window panel is disposed at the opening, and an opened position, where said movable window panel is disposed at least partially along said at least one fixed window panel;
a perimeter seal disposed at a surface of said at least one fixed window panel, wherein said perimeter seal comprises a continuous sealing element that circumscribes the opening and that is configured to seal against a surface of said movable window panel about a periphery of said movable window panel when said movable window panel is in the closed position;
wherein said perimeter seal comprises a plurality of elongated sealing portions including an elongated upper sealing portion, an elongated lower sealing portion, a first elongated side sealing portion and a second elongated side sealing portion, and wherein said elongated sealing portions comprise respective elongated sealing lips disposed along respective base portions;
a corner sealing element disposed at a corner region of said perimeter seal at a junction of the first elongated side sealing portion and one selected from the group consisting of (i) the elongated upper sealing portion and (ii) the elongated lower sealing portion;
wherein said corner sealing element extends from an end of said sealing lip of said first elongated side sealing portion and is spaced from an end of said sealing lip of the one of said elongated upper sealing portion and said elongated lower sealing portion, and wherein said corner sealing element extends partially along the one of said elongated upper sealing portion and said elongated lower sealing portion spaced from said sealing lip of the one of said elongated upper sealing portion and said elongated lower sealing portion;
wherein said perimeter seal is formed via a multi-shot injection molding process, and wherein said base portions are formed via a first shot injection molding process and said sealing lips are formed along said base portions via a second shot injection molding process; and
wherein the first shot injection molding process forms said base portions using a polypropylene material, and wherein the second shot injection molding process forms said sealing lips using a thermoplastic elastomer.

2. The vehicular slider window assembly of claim 1, wherein the second shot injection molding process forms the corner sealing element.

3. The vehicular slider window assembly of claim 1, wherein said at least one fixed window panel comprises first and second fixed window panels defining the opening therebetween.

4. The vehicular slider window assembly of claim 3, wherein said perimeter seal is adhesively attached at respective surfaces of said first and second fixed window panels and at respective surfaces of upper and lower appliqués so as to be attached around the opening.

5. The vehicular slider window assembly of claim 4, wherein said upper rail comprises a rail attachment portion that attaches at said at least one fixed window panel and at an upper appliqué, and wherein said perimeter seal is adhesively attached at respective surfaces of said first and second fixed window panels and at said rail attachment portion at said upper appliqué.

6. The vehicular slider window assembly of claim 1, wherein said at least one fixed window panel comprises a single fixed window panel having the opening therethrough, and wherein said perimeter seal is adhesively attached at a surface of said single fixed window panel around the opening.

7. A vehicular slider window assembly, said vehicular slider window assembly comprising:
at least one fixed window panel, said at least one fixed window panel defining an opening;
an upper rail and a lower rail fixedly disposed at said at least one fixed window panel;
a movable window panel that is movable along said upper rail and said lower rail, wherein said movable window panel is movable between a closed position, where said movable window panel is disposed at the opening, and an opened position, where said movable window panel is disposed at least partially along said at least one fixed window panel;
a perimeter seal disposed at a surface of said at least one fixed window panel, wherein said perimeter seal comprises a continuous sealing element that circumscribes the opening and that is configured to seal against a surface of said movable window panel about a periphery of said movable window panel when said movable window panel is in the closed position;
wherein said perimeter seal comprises a plurality of elongated sealing portions including an elongated upper sealing portion, an elongated lower sealing portion, a first elongated side sealing portion and a second elongated side sealing portion, and wherein said elongated sealing portions comprise respective elongated sealing lips disposed along respective base portions;
wherein said perimeter seal is formed via a multi-shot injection molding process, and wherein said base portions are formed via a first shot injection molding process and said sealing lips are formed along said base portions via a second shot injection molding process;
wherein the first shot injection molding process forms said base portions using a polypropylene material, and wherein the second shot injection molding process forms said sealing lips using a thermoplastic elastomer;
wherein the second shot injection molding process forms a corner sealing element that joins adjacent ends of said sealing lips at corner regions of said perimeter seal; and
wherein one of said corner sealing elements extends from an end of said sealing lip of said first elongated side sealing portion and is spaced from an end of said sealing lip of said elongated upper sealing portion, and wherein said one of said corner sealing elements extends partially along said elongated upper sealing portion above said sealing lip of said elongated upper sealing portion.

8. The vehicular slider window assembly of claim 7, wherein said perimeter seal comprises a flexible element that connects between said one of said corner sealing elements and said sealing lip of said elongated upper sealing portion to allow for flexing of said sealing lip of said elongated upper sealing portion without restricting flexing of said sealing lip of said first elongated side sealing portion.

9. The vehicular slider window assembly of claim 8, wherein said sealing lip of said first elongated side sealing portion comprises a double lip configuration, and wherein said one of said corner sealing elements extends from an inboard lip of said double lip configuration of said first elongated side sealing portion.

10. The vehicular slider window assembly of claim 7, wherein said at least one fixed window panel comprises first and second fixed window panels defining the opening therebetween.

11. The vehicular slider window assembly of claim 10, wherein said perimeter seal is adhesively attached at respective surfaces of said first and second fixed window panels and at respective surfaces of upper and lower appliqués so as to be attached around the opening.

12. The vehicular slider window assembly of claim 11, wherein said upper rail comprises a rail attachment portion that attaches at said at least one fixed window panel and at an upper appliqué, and wherein said perimeter seal is adhesively attached at respective surfaces of said first and second fixed window panels and at said rail attachment portion at said upper appliqué.

13. The vehicular slider window assembly of claim 7, wherein said at least one fixed window panel comprises a single fixed window panel having the opening therethrough, and wherein said perimeter seal is adhesively attached at a surface of said single fixed window panel around the opening.

14. A vehicular slider window assembly, said vehicular slider window assembly comprising:
at least one fixed window panel, said at least one fixed window panel defining an opening;
an upper rail and a lower rail fixedly disposed at said at least one fixed window panel;
a movable window panel that is movable along said upper rail and said lower rail, wherein said movable window panel is movable between a closed position, where said movable window panel is disposed at the opening, and an opened position, where said movable window panel is disposed at least partially along said at least one fixed window panel;
a perimeter seal disposed at a surface of said at least one fixed window panel, wherein said perimeter seal comprises a continuous sealing element that circumscribes the opening and that is configured to seal against a surface of said movable window panel about a periphery of said movable window panel when said movable window panel is in the closed position;
wherein said perimeter seal comprises a plurality of elongated sealing portions including an elongated upper sealing portion, an elongated lower sealing portion, a first elongated side sealing portion and a second elongated side sealing portion, and wherein said elongated sealing portions comprise respective elongated sealing lips disposed along respective base portions;
a corner sealing element disposed at a corner region of said perimeter seal at a junction of said elongated upper sealing portion and first elongated side sealing portion;
wherein said corner sealing element extends from an end of said sealing lip of said first elongated side sealing portion and is spaced from an end of said sealing lip of said elongated upper sealing portion, and wherein said corner sealing element extends partially along said elongated upper sealing portion above said sealing lip of said elongated upper sealing portion; and
wherein said perimeter seal comprise a flexible element that connects between said corner sealing element and said sealing lip of said elongated upper sealing portion to allow for flexing of said sealing lip of said elongated upper sealing portion without restricting flexing of said sealing lip of said first elongated side sealing portion.

15. The vehicular slider window assembly of claim 14, wherein said sealing lip of said first elongated side sealing portion comprises a double lip configuration, and wherein said corner sealing element extends from an inboard lip of said double lip configuration of said first elongated side sealing portion.

16. The vehicular slider window assembly of claim 14, wherein said perimeter seal comprises another corner sealing element and another flexible element at another corner region at the junction of said elongated lower sealing portion and said second elongated side sealing portion.

17. The vehicular slider window assembly of claim 14, wherein said at least one fixed window panel comprises first and second fixed window panels defining the opening therebetween.

18. The vehicular slider window assembly of claim 17, wherein said perimeter seal is adhesively attached at respective surfaces of said first and second fixed window panels and at respective surfaces of upper and lower appliqués so as to be attached around the opening.

19. The vehicular slider window assembly of claim 14, wherein said at least one fixed window panel comprises a single fixed window panel having the opening therethrough, and wherein said perimeter seal is adhesively attached at a surface of said single fixed window panel around the opening.

* * * * *

UNITED STATES PATENT AND TRADEMARK OFFICE
CERTIFICATE OF CORRECTION

| | |
|---|---|
| PATENT NO. | : 11,938,793 B2 |
| APPLICATION NO. | : 16/817720 |
| DATED | : March 26, 2024 |
| INVENTOR(S) | : Darin J. Snider et al. |

It is certified that error appears in the above-identified patent and that said Letters Patent is hereby corrected as shown below:

In the Specification

<u>Column 2</u>
Lines 33-34, "movable window panel" should be --movable window panel 20--
Line 38, "movable window panel" should be --movable window panel 20--

In the Claims

<u>Column 10</u>
Line 16, Claim 14, "seal comprise a flexible" should be --seal comprises a flexible--

Signed and Sealed this
Thirtieth Day of April, 2024

Katherine Kelly Vidal
*Director of the United States Patent and Trademark Office*